US012607258B2

(12) United States Patent  
Kölbl et al.

(10) Patent No.: US 12,607,258 B2  
(45) Date of Patent: Apr. 21, 2026

(54) METHOD FOR ADAPTING A PRESSURE CHARACTERISTIC LINE OF A FRICTION-LOCKING SHIFTING ELEMENT OF A TRANSMISSION, AND CONTROLLER

(71) Applicant: ZF Friedrichshafen AG, Friedrichshafen (DE)

(72) Inventors: Philipp Kölbl, Friedrichshafen (DE); Dennis Schaer, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/879,084

(22) PCT Filed: Jun. 19, 2023

(86) PCT No.: PCT/EP2023/066351  
§ 371 (c)(1),  
(2) Date: Dec. 26, 2024

(87) PCT Pub. No.: WO2024/002732  
PCT Pub. Date: Jan. 4, 2024

(65) Prior Publication Data  
US 2025/0383018 A1 Dec. 18, 2025

(30) Foreign Application Priority Data  
Jun. 28, 2022 (DE) .......................... 102022206482.8

(51) Int. Cl.  
*F16H 61/06* (2006.01)  
*F16H 61/00* (2006.01)

(52) U.S. Cl.  
CPC ... *F16H 61/061* (2013.01); *F16H 2061/0062* (2013.01); *F16H 2061/0087* (2013.01); *F16H 2061/062* (2013.01)

(58) Field of Classification Search  
CPC ........... F16H 61/061; F16H 2061/0062; F16H 2061/0087; F16H 2061/062  
See application file for complete search history.

(56) References Cited

U.S. PATENT DOCUMENTS 6,101,438 A * 8/2000 Staiger .................. F16H 61/061  
　　　　　　　　　　　　　　　　　　　　701/55  
6,569,060 B2 * 5/2003 Rosi ...................... F16H 61/061  
　　　　　　　　　　　　　　　　　　　　701/58

(Continued)

FOREIGN PATENT DOCUMENTS

DE　　　　10042146 A1　3/2002  
DE　　102005016672 B4　11/2018

(Continued)

OTHER PUBLICATIONS

German Search Report for Application No. 102022206482.8 Dated Mar. 16, 2023.

(Continued)

*Primary Examiner* — Huan Le  
(74) *Attorney, Agent, or Firm* — Dority & Manning, P.A.

(57) ABSTRACT

A method for adapting a pressure characteristic curve of a friction-locking shift element of a transmission of a motor vehicle includes actuating the shift element using a rapid filling pressure for a first time, shorter than an adapted rapid filling time by a defined period of time. The method further includes subsequently actuating the shift element using a waiting pressure for a waiting time, the waiting pressure being lower than the rapid filling pressure. The method further includes subsequently actuating the shift element using the rapid filling pressure during a second time, equal to the defined period of time, and ascertaining a reaction of the transmission to adaptation. Additionally, the method includes determining, when the reaction of the transmission to the adaptation corresponds to a reaction to the rapid filling (Continued)

time adaptation, a pressure at a characteristic point on the curve being adapted as the waiting pressure.

6 Claims, 2 Drawing Sheets

(56)                    References Cited

U.S. PATENT DOCUMENTS

| | | | |
|---|---|---|---|
| 6,672,990 B2 | | 1/2004 | Netzer |
| 8,510,006 B2 * | | 8/2013 | Bader .................. F16D 48/066 |
| | | | 703/2 |
| 8,843,289 B2 | | 9/2014 | Postic et al. |
| 9,746,074 B2 * | | 8/2017 | Kitazawa ........ B60W 30/18027 |
| 11,982,296 B2 | | 5/2024 | Mayer et al. |

FOREIGN PATENT DOCUMENTS

| | | | |
|---|---|---|---|
| DE | 102017209786 A1 | 12/2018 |
| DE | 102019100376 A1 | 7/2020 |
| WO | WO2011076509 A1 | 6/2011 |
| WO | WO2018014905 A1 | 1/2018 |
| WO | WO2022017554 A1 | 1/2022 |

OTHER PUBLICATIONS

International Search Report for Application No. PCT/EP2023/066351 Dated Sep. 5, 2023.

* cited by examiner

METHOD FOR ADAPTING A PRESSURE CHARACTERISTIC LINE OF A FRICTION-LOCKING SHIFTING ELEMENT OF A TRANSMISSION, AND CONTROLLER

CROSS-REFERENCE TO RELATED APPLICATION

The present application is related and has right of priority to German Patent Application No. 10 2022 206 482.8 filed on Jun. 28, 2022 and is a nationalization of PCT/EP2023/066351 filed in the European Patent Office on Jun. 19, 2023, both of which are incorporated by reference in their entirety for all purposes.

FIELD OF THE INVENTION

The invention relates generally to a method for adapting a pressure characteristic curve of a friction-locking shift element of a transmission. The invention also relates generally to a control unit for operating a transmission.

BACKGROUND

A drive train of a motor vehicle includes a propulsion unit and a transmission connected between the propulsion unit and a drive output. The transmission converts rotational speeds and torques and provides the available tractive force of the propulsion unit at the drive output. The transmission includes multiple shift elements, which can be friction-locking shift elements and/or positive-locking shift elements. A friction-locking shift element is, in particular, a clutch or a brake. A positive-locking shift element is, in particular, a dog. In every engaged gear of a transmission, a first number of the shift elements of the transmission is engaged and a second number of the shift elements of the transmission is disengaged. In order to change gears, at least one previously engaged shift element is disengaged and at least one previously disengaged shift element is engaged.

The shift elements of a transmission are actuated for engagement using a pressure actuation, which pressure actuation of a shift element is carried out according to at least one pressure characteristic curve. A pressure characteristic curve of a friction-locking shift element of a transmission that is known is, for example, a pressure-time characteristic curve as well as a pressure-travel characteristic curve. The pressure-time characteristic curve defines a plot over time of the pressure actuation of a shift element and is sub-divided into multiple phases, such as a rapid filling phase, a filling equalization phase, as well as into further phases following the filling equalization phase. A pressure-travel characteristic curve defines an actuation travel of the friction-locking shift element depending on the actuating pressure.

DE 100 42 146 A1 and U.S. Pat. No. 8,510,006 B2 describe pressure-time characteristic curves of friction-locking shift elements of a transmission, as well as methods, by which a rapid filling time of a rapid filling phase can be adapted.

WO 2022/017 554 A1, WO 2018/014 905 A1, DE 10 2019 100 376 A1, and U.S. Pat. No. 8,843,289 B2 disclose further details of a pressure actuation of friction-locking shift elements of a transmission.

Although it is already known with respect to a rapid filling time adaptation to adapt the rapid filling time of a friction-locking shift element for a rapid filling pressure and, depending thereon, to actuate a friction-locking shift element for engagement, there is a need to improve the actuation of a friction-locking shift element, specifically to make this possible with even higher quality. In particular, there is a need to adapt a touch point and/or a contact point of a pressure characteristic curve, in particular of a pressure-travel characteristic curve of a friction-locking shift element, in order to be able to carry out the engagement process of a friction-locking shift element even more accurately and thus with even higher quality.

SUMMARY OF THE INVENTION

On the basis thereof, a new type of method and control unit for adapting a pressure characteristic curve of a friction-locking shift element of a transmission is provided.

A method for adapting a pressure characteristic curve of a friction-locking shift element of a motor vehicle transmission is provided.

According to the invention, as the characteristic point to be adapted, a characteristic point on the pressure characteristic curve to be adapted is selected or accepted that sets in when the shift element is actuated for engagement using the rapid filling pressure for an actuation duration which is shorter than the adapted rapid filling time by a defined period of time.

According to the invention, in order to adapt the pressure at this characteristic point, the shift element is first actuated for engagement using the rapid filling pressure for a first time duration, which is shorter than the adapted rapid filling time by the defined period of time.

The shift element is then actuated using a waiting pressure, which is lower than the rapid filling pressure, for a waiting time duration.

The shift element is then actuated using the rapid filling pressure for a second time duration, which corresponds to the defined period of time, and a reaction of the transmission to the adaptation is ascertained in the process. If it is then established that the reaction to the adaptation corresponds to the reaction to the rapid filling time adaptation, the current waiting pressure is determined as the pressure, which is to be adapted, at the characteristic point, which is to be adapted, on the pressure characteristic curve to be adapted.

The method according to the invention is based on the assumption that the rapid filling time is adapted using a rapid filling time adaptation that is known per se. The rapid filling time adaptation is carried out in the manner known from the prior art.

On the basis of the ascertained rapid filling time, a point on the pressure characteristic curve to be adapted is selected, which point sets in when the shift element is actuated for engagement using the rapid filling pressure for an actuation time which is shorter than the adapted rapid filling time by a defined period of time. The pressure at this characteristic point is adapted using the aforementioned method steps, specifically in that the shift element is first actuated for engagement using the rapid filling pressure for the first time duration, which is shorter than the adapted rapid filling time by the defined period of time, wherein the shift element is then actuated using the waiting pressure, which is lower than the rapid filling pressure, for the waiting time duration, wherein the shift element is then actuated using the rapid filling pressure for the second time duration, which corresponds to the defined period of time, and the reaction of the transmission to the adaptation is ascertained in the process.

If it is then established that the reaction to the adaptation corresponds to the reaction to the rapid filling time adaptation, the current waiting pressure is determined as the pressure, which is to be adapted, at the characteristic point, which is to be adapted, on the pressure characteristic curve to be adapted.

In contrast, if it is established that the reaction to the adaptation does not correspond to the reaction to the rapid filling time adaptation, i.e., deviates therefrom by more than a defined limit value, the waiting pressure is increased by a defined increment and the aforementioned method steps are carried out again and are repeated with an incremental increase in the waiting pressure as frequently as necessary until the reaction to the adaptation corresponds to the reaction to the rapid filling time adaptation.

By a pressure characteristic curve that is adapted in such a way, a highly accurate and high-quality actuation of friction-locking shift elements of a transmission is ensured.

Preferably, a touch point and/or a contact point and/or a characteristic point between the touch point and the contact point are/is adapted as the characteristic point on the pressure characteristic curve to be adapted. The method according to the invention is preferably used to adapt the touch point and/or the contact point and/or a point between the touch point and the contact point on the pressure characteristic curve. The touch point is the point on the pressure characteristic curve at which a friction-locking shift element begins to transmit torque and on the basis of drag torques. The contact point is the point at which the friction-locking shift element begins to transmit torque, mainly on the basis of friction between shift element halves of the particular friction-locking shift element.

A control unit for operating a motor vehicle transmission is also provided.

BRIEF DESCRIPTION OF THE DRAWINGS

Preferred developments can be found in the dependent claims and in the following description. Exemplary embodiments of the invention are explained in greater detail with reference to the drawing, without being limited thereto, wherein:

DETAILED DESCRIPTION

Figures 1, 2:
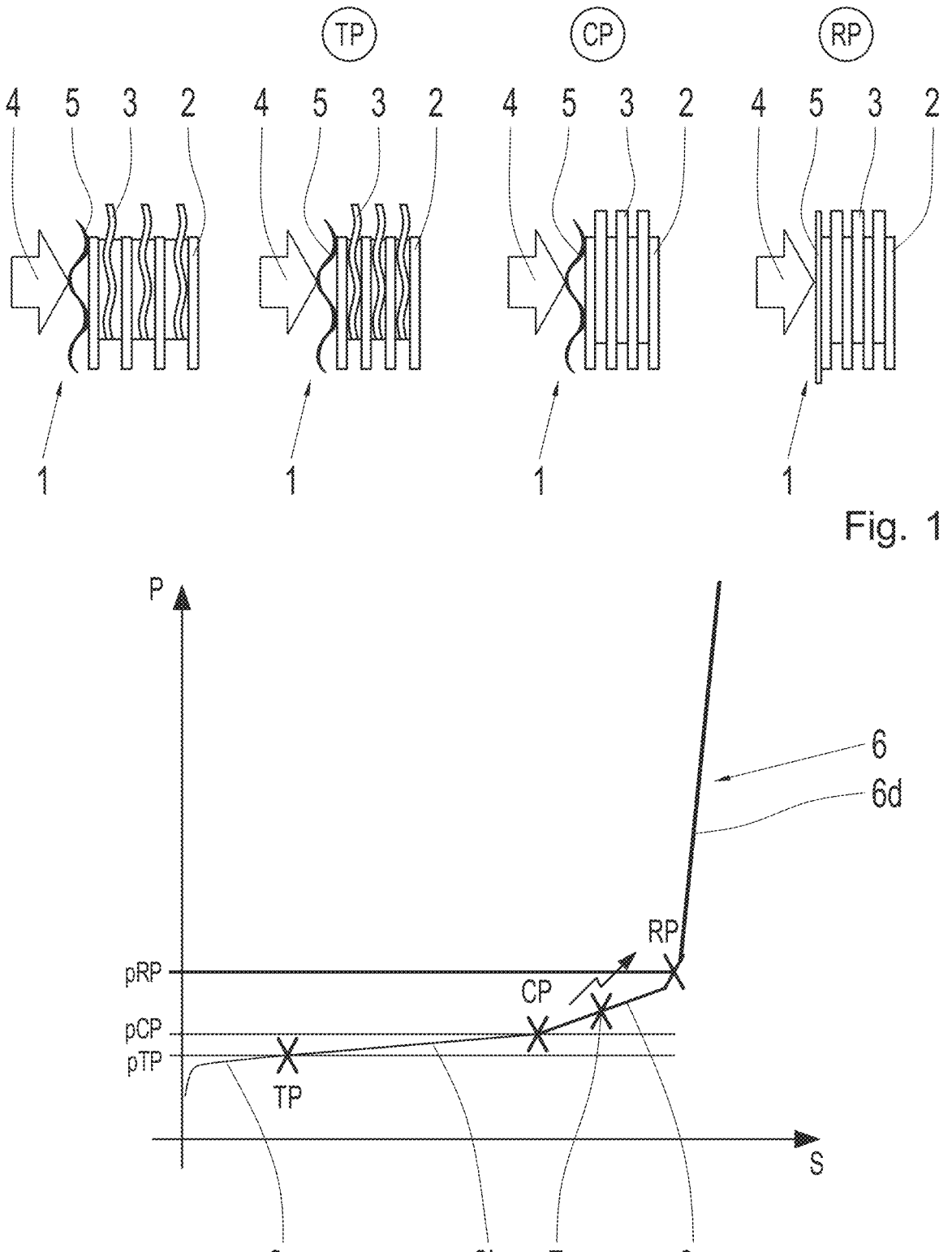
FIG. 1 shows a friction-locking shift element with a wave spring in different engagement positions.
FIG. 2 shows a pressure characteristic curve of the friction-locking shift element from FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows, in a highly schematic manner, a friction-locking shift element 1 of a motor vehicle transmission. The friction-locking shift element 1 has two shift element halves 2, 3. Each shift element half 2, 3 includes multiple disks. The shift element halves 2, 3 are displaceable in relation to one another, in order to disengage or engage the particular shift element 1, depending on a pressure actuation 4 which acts on a piston (not shown) of the friction-locking shift element 1. The shift element 1 shown in FIG. 1 also includes a wave spring 5.

In the state on the left in FIG. 1, the shift element 1 is fully disengaged, the shift element is not transmitting torque, and there is maximum clearance between the shift element halves 2, 3.

In the second state from the left, the shift element 1 shown in FIG. 1 is engaged up to the touch point TP, wherein, at the touch point TP, there is still clearance and the shift element 1 begins to transmit torque, mainly due to drag torques.

If the shift element 1 is engaged further, the shift element then assumes the third state from the left shown in FIG. 1, in which the shift element 1 is engaged up to the contact point CP. At the contact point CP, the clearance between the shift element halves 2, 3 has been entirely eliminated and the friction-locking shift element 1 then begins to transmit torque mainly due to friction between the shift element halves 2, 3.

When the shift element 1 is engaged further, a wave spring 5 thereof is compressed, wherein, when the shift element 1 shown in FIG. 1 is in the state on the right in FIG. 1, the wave spring 5 is compressed and the shift element 1 transitions from an elastic state into a rigid state.

The point at which the wave spring 5 is compressed and at which the friction-locking shift element 1 transitions from the elastic state into the rigid state is also referred to as the reaction point RP.

FIG. 2 shows a pressure characteristic curve for the shift element 1 from FIG. 1, specifically a pressure-travel characteristic curve 6, which shows a dependency between the actuating pressure p and an actuation travel s of the piston of the friction-locking shift element 1. A characteristic curve range 6a visualizes the shifting travel s of the shift element 1 from a disengaged clutch up to the touch point TP. The characteristic curve range 6b visualizes the pressure-travel dependency between the touch point TP and the contact point CP. The characteristic curve range 6c visualizes the pressure-travel dependency between the contact point CP and the reaction point RP. The characteristic curve range 6d visualizes the actuation travel s of the friction-locking shift element 1 as a function of the pressure actuation p for the rigid state of the shift element 1.

The invention now relates to adapting the touch point TP and/or the contact point CP and/or any characteristic point on the characteristic curve range 6b between the touch point TP and the contact point CP on the pressure-travel characteristic curve shown in FIG. 2.

For this adaptation, the result of a rapid filling time adaptation of the friction-locking shift element 1 is applied, via which rapid filling time adaptation a rapid filling time of the friction-locking shift element is adapted for a rapid filling pressure. The details of such a rapid filling time adaptation are known to a person skilled in the art addressed here, for example, from DE 100 42 146 A1 and from U.S. Pat. No. 8,510,006 B2. Via a rapid filling time adaptation, the rapid filling time of the friction-locking shift element is adapted, wherein, in particular, a rapid filling jolt in the drive train is recognized as the reaction to the rapid filling time adaptation. During a rapid filling time adaptation, a characteristic point on the pressure-travel characteristic curve 6 is ascertained, which characteristic point, as shown in FIG. 2, lies on the characteristic curve section 6c, i.e., between the contact point CP and the reaction point RP. The characteristic point ascertained during the rapid filling time adaptation is, for example, the characteristic point 7 shown in FIG. 2.

Figure 3:
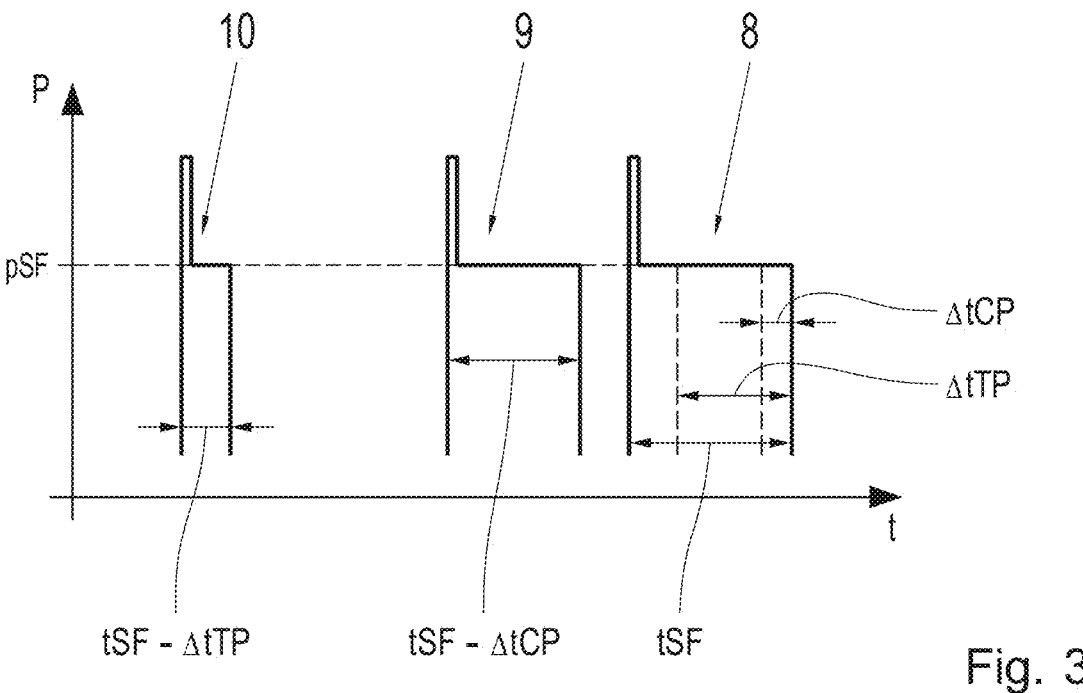
FIG. 3 shows characteristic values of the friction-locking shift element ascertained depending on a rapid filling time adaptation.

The curve profile 8 shown in FIG. 3, in which the actuating pressure p is plotted over time t, shows the result of a rapid filling time adaptation. A shift element 1 is actuated using a rapid filling pressure pSF until the reaction to the rapid filling time adaptation is detected, wherein the period of time tSF between the beginning of a rapid filling phase and the detection of the reaction to the rapid filling time adaption corresponds to the adapted rapid filling time tSF.

In the transmission control unit, a first period of time ΔtCP is stored for the contact point CP and a second defined period of time ΔtTP is stored for the touch point TP, by which periods of time the adapted rapid filling time tSF is to be reduced in order to engage the friction-locking shift element 1 up to the contact point CP or up to the touch point TP depending on a stored pressure-travel characteristic curve 6 to be adapted according to the invention.

The curve profile 9 visualizes an actuation of a friction-locking shift element 1 using the rapid filling pressure pSF with an actuation duration tSF-ΔtCP, which is shorter than the adapted rapid filling time tSF by the first defined period of time ΔtCP. The curve profile 10 shown in FIG. 3 visualizes the actuation of the friction-locking shift element 1 with the actuation duration tSF-ΔtTP, which is shorter than the adapted rapid filling time tSF by the second defined period of time ΔtTP.

Figure 4:
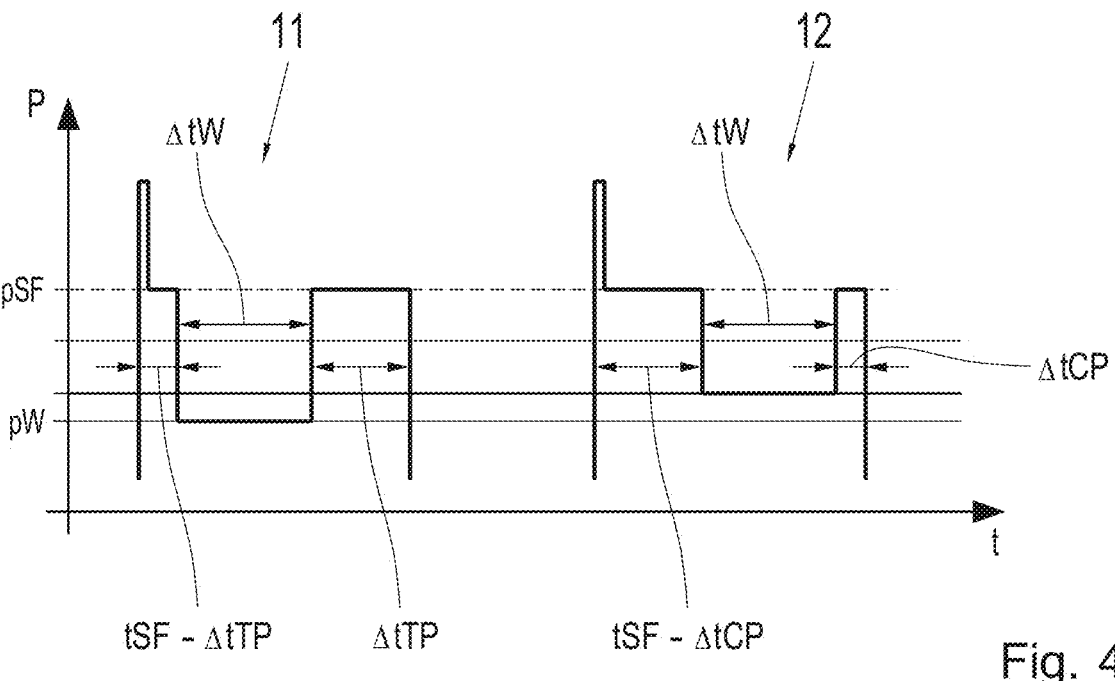
FIG. 4 shows a diagram for illustrating the adaptation according to the invention during the adaptation of a touch point and during the adaptation of a contact point on the pressure characteristic curve of the friction-locking shift element.

In order to then adapt the touch point TP of the pressure-travel characteristic curve 6 depending on the adapted rapid filling time tSF, which has been adapted in a known manner, the next steps are taken as shown in FIG. 4 with the curve profile 11.

In order to adapt the pressure pTP at the touch point TP, during the adaptation according to the invention, the friction-locking shift element 1 is actuated for engagement using the rapid filling pressure pSF for a first time duration tSF-ΔtTP, which is shorter than the adapted rapid filling time tSF by the defined first period of time ΔtTP.

The shift element is then actuated for a waiting time duration ΔtW using a waiting pressure pW, which is lower than the pressure pTP, which is to be adapted, at the touch point TP.

Subsequent to this waiting time ΔtW, the friction-locking shift element is actuated again for engagement using the rapid filling pressure pSF for a second time duration, which corresponds (is equal) to the defined period of time ΔtTP, and a reaction of the transmission to the adaptation is ascertained at the end of this second time duration ΔtTP.

If it is established that this reaction to the adaptation corresponds to the reaction to the rapid filling time adaptation, the current waiting pressure pW is determined as the pressure, which is to be adapted, at the touch point TP on the pressure characteristic curve 6 to be adapted.

In contrast, if it is established that the reaction to the adaptation deviates from the reaction to the rapid filling time adaptation by more than a limit value, i.e., does not correspond thereto, the waiting pressure pW is increased by a defined increment and the aforementioned steps are carried out again, with an incremental increase of the waiting pressure until it is established that the reaction of the method according to the invention to the adaptation corresponds to the reaction to the rapid filling time adaptation.

The curve profile 12 shows the approach for adapting the pressure at the contact point CP on the pressure characteristic curve 6, wherein, for this purpose, the friction-locking shift element 1 is first actuated for engagement using the rapid filling pressure pSF for a first time duration tSF-ΔtCP, which is shorter than the adapted rapid filling time tSF by the defined period of time ΔtCP. The shift element 11 is then actuated using a waiting pressure pW, which is lower than the pressure pCP, which is to be adapted, at the contact point CP to be adapted, for the waiting time duration ΔtW. The shift element is then actuated again using the rapid filling pressure pSF for a defined second time duration, which corresponds to the defined period of time ΔtCP of the contact point CP, and the reaction of the transmission to the adaptation is ascertained again in the process. If this reaction to the adaptation corresponds to the reaction to the rapid filling time adaptation, the current waiting pressure is determined as the pressure pCP, which is to be adapted, at the contact point CP. If this is not the case, however, the waiting pressure pW is increased by one increment and the aforementioned method is carried out again, with an incremental increase of the waiting pressure as frequently as necessary until the reaction to the adaptation corresponds to the reaction to the rapid filling time adaptation.

Using the above-described method, every characteristic point in the characteristic curve range 6b of the pressure characteristic curve 6 between the touch point TP and the contact point CP is adaptable.

Via a pressure characteristic curve 6 adapted using the method according to the invention, a friction-locking shift element is highly accurately actuated with high quality in particular between the touch point TP and the contact point CP.

The invention also relates to a control unit, which automatically carries out the above-described method. This control unit is, in particular, an electronic transmission control unit of a motor vehicle transmission. Such an electronic transmission control unit includes hardware-related means and software-related means. The hardware-related means include, in particular, data interfaces for exchanging data with the assemblies contributing to the execution of the method according to the invention, such as, for example, with hydraulic valves for pressurizing the shift element 1. The hardware-related means also include a memory for data storage and a processor for data processing. The software-related means include program modules, which are implemented in the control unit to automatically carry out the method according to the invention.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 shift element
2 shift element half
3 shift element half
4 pressure actuation
5 wave spring 6 pressure characteristic curve
6a characteristic curve range
6b characteristic curve range
6c characteristic curve range
6d characteristic curve range
7 characteristic point
8 curve profile
9 curve profile
10 curve profile
11 curve profile
12 curve profile

The invention claimed is:

1. A method for adapting a pressure characteristic curve (6) of a friction-locking shift element (1) of a transmission of a motor vehicle, a rapid filling time of the friction-locking shift element (1) being adapted to an adapted rapid filling time (tSF) for a rapid filling pressure (pSF) via a rapid filling time adaptation of the friction-locking shift element (1), a reaction of the transmission to the rapid filling time adaptation being ascertained, the method comprising:

a) selecting a characteristic point (TP; CP) to be adapted on the pressure characteristic curve (6) when the friction-locking shift element (1) is actuated for engagement using the rapid filling pressure (pSF) for an actuation duration which is shorter than the adapted rapid filling time (tSF) by a defined period of time (ΔtTP; ΔtCP);

b) actuating the friction-locking shift element (1) towards engagement using the rapid filling pressure (pSF) for a first time duration (tSF-ΔtTP; tSF-ΔtCP), the first time duration being shorter than the adapted rapid filling time (tSF) by the defined period of time (ΔtTP; ΔtCP);

c) actuating the friction-locking shift element (1) using a waiting pressure (pW) for a waiting time duration (ΔtW), the waiting pressure (pW) being lower than the rapid filling pressure (pSF), the waiting time duration (ΔtW) being subsequent to the first time duration (tSF-ΔtTP; tSF-ΔtCP);

d) actuating the friction-locking shift element (1) using the rapid filling pressure (pSF) during a second time duration and ascertaining a reaction of the transmission to adaptation, the second time duration being equal to the defined period of time (ΔtTP; ΔtCP), the second time duration being subsequent to the waiting time duration (ΔtW); and e) determining, when the reaction of the transmission to the adaptation corresponds to the reaction of the transmission to the rapid filling time adaptation, a pressure to be adapted at the characteristic point (TP; CP) on the pressure characteristic curve (6) as the waiting pressure (pW).

2. The method of claim 1, increasing, when the reaction of the transmission to the adaptation deviates from the reaction of the transmission to the rapid filling time adaptation by more than a limit value, the waiting pressure by a defined increment and subsequently performing steps b) through e) again.

3. The method of claim 1, wherein selecting the characteristic point (TP; CP) to be adapted comprises selecting a touch point (TP) as the characteristic point to be adapted on the pressure characteristic curve.

4. The method of claim 1, wherein selecting the characteristic point (TP; CP) to be adapted comprises selecting a contact point (CP) as the characteristic point to be adapted on the pressure characteristic curve.

5. The method of claim 1, wherein selecting the characteristic point to be adapted comprises selecting a characteristic point between a touch point (TP) and a contact point (CP) as the characteristic point to be adapted on the pressure characteristic curve.

6. A control unit for operating a motor vehicle transmission, the control unit being configured to automatically perform the method of claim 1.

* * * * *